Figure 1:
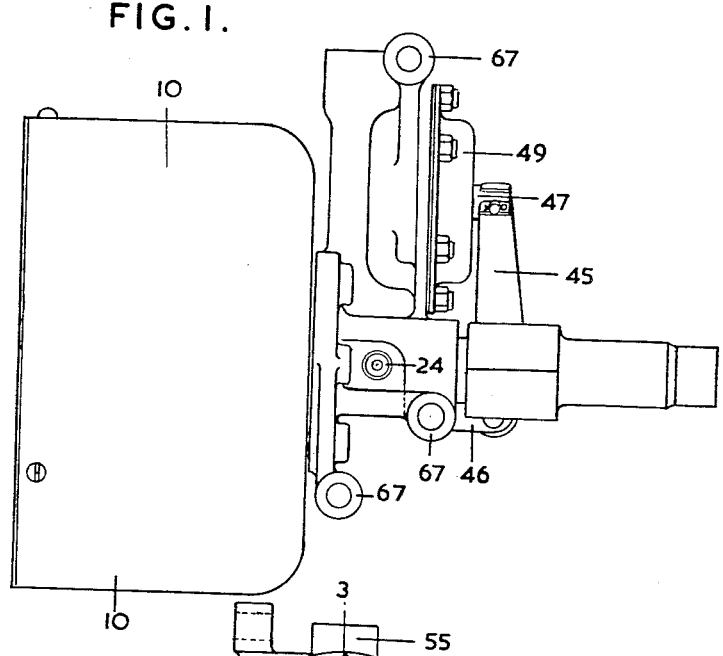

Oct. 18, 1955  J. H. PRATT  2,720,954
BRAKES
Filed Oct. 23, 1951  3 Sheets-Sheet 1

INVENTOR:
JAMES HENRY PRATT
by Walter S. Poleston
ATTORNEY

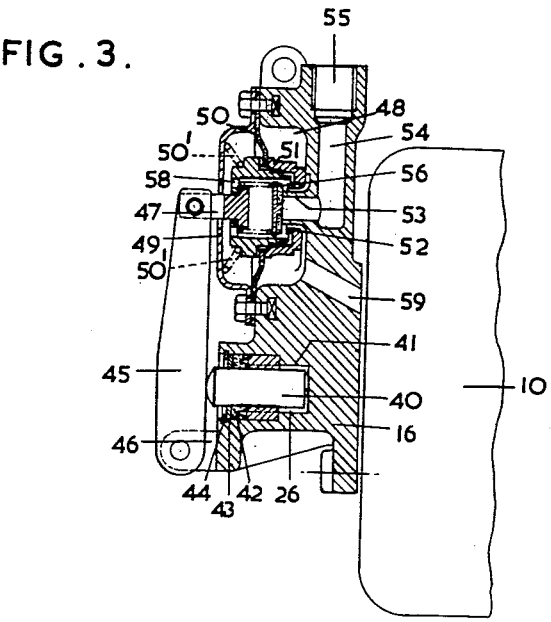
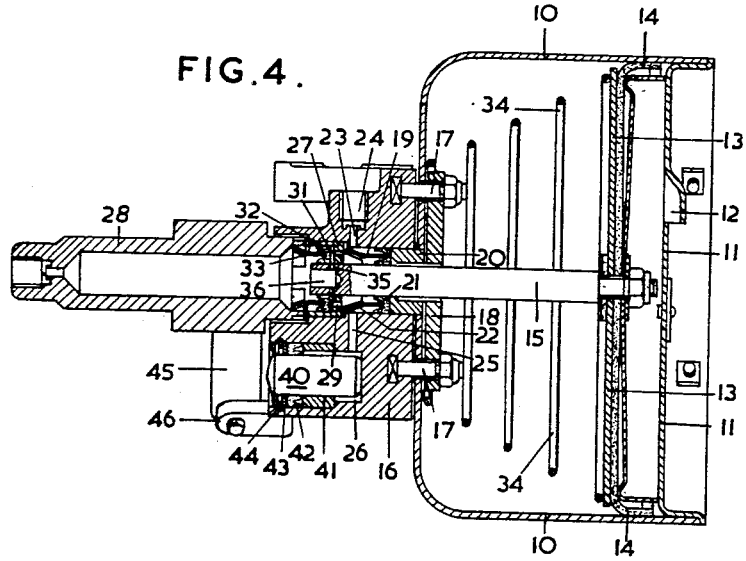

Oct. 18, 1955    J. H. PRATT    2,720,954
BRAKES

Filed Oct. 23, 1951    3 Sheets-Sheet 3

INVENTOR
JAMES HENRY PRATT
by Walter S. Pleston
ATTORNEY

United States Patent Office 2,720,954
Patented Oct. 18, 1955

2,720,954

BRAKES

James Henry Pratt, Wythall, near Birmingham, England, assignor to Girling Limited, Birmingham, England, a British company Application October 23, 1951, Serial No. 252,659

Claims priority, application Great Britain October 27, 1950

7 Claims. (Cl. 192—4)

This invention relates to improvements in braking systems of the kind in which the application of the brakes is effected by a vacuum cylinder through an hydraulic transmission line.

According to my invention, in a braking system of that kind a pedal operated master cylinder is adapted to supply liquid under pressure to actuate a valve controlling the connection of a vacuum cylinder to a source of vacuum, and an auxiliary hydraulic cylinder connected to the brake cylinder or cylinders is arranged in alignment with the piston-rod of the vacuum cylinder and communicates with the master cylinder through a port or ports which are normally open but are adapted to be closed by a movement of the piston-rod of the vacuum cylinder away from the retracted position to advance it into the auxiliary cylinder.

When the pedal is depressed the pressure in the system builds up and at a predetermined pressure the vacuum valve begins to open to connect the vacuum cylinder to the source of vacuum and the piston rod is advanced. After a short forward movement of the piston-rod the ports leading to the auxiliary cylinder are closed so that communication between the master cylinder and the auxiliary cylinder is cut off and on any further movement of the pedal the whole of the liquid displaced by the piston of the master cylinder is applied to the pressure-operated valve while the application of the brakes is effected by the movement of the piston-rod of the vacuum cylinder into the auxiliary cylinder.

If the resistance offered by the pull-off or return springs in the brakes to the entry of liquid into the brake cylinders is greater than that offered by the loading of the vacuum valve there will be no appreciable movement of liquid into the auxiliary cylinder before the valve opens and the whole of the movement of the brake shoes will be effected by the vacuum cylinder.

Alternatively, if the resistance offered by the pull-off or return springs is less, the first part of the pedal movement will force liquid into the auxiliary cylinder and so into the brake cylinders to bring the braking surfaces into engagement, and then as the pressure in the system builds up the vacuum valve will open and the whole of the further application of the brakes will be effected by the vacuum cylinder.

In either case any deficiency in the liquid in the auxiliary cylinder and the pipe lines leading from it to the brake cylinders will be automatically made up by the transfer of liquid from the master cylinder during the first part of the pedal movement.

The pressure-operated valve is so arranged that the hydraulic pressure applied to the movable part of the valve is opposed by a diaphragm or piston exposed to the depression in the vacuum cylinder so that the resistance to the pedal movement is proportional to the effort exerted by the vacuum cylinder and the driver is given the "feel" of the brakes.

Where my invention is applied to the operation of shoe brakes for vehicles in which the shoes are trailing shoes in the normal forward direction of travel, it may be desirable to arrange that the vacuum booster does not come into operation when the vehicle is travelling in reverse, and for this purpose a shut-off valve coupled to and actuated by the selector for reverse gear may be provided to prevent the vacuum valve from being opened while reverse gear is engaged.

Figure 2:
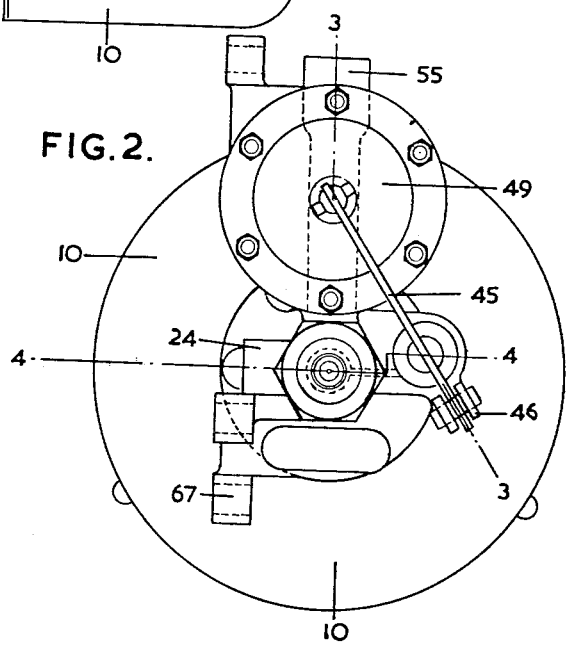
Figure 5:
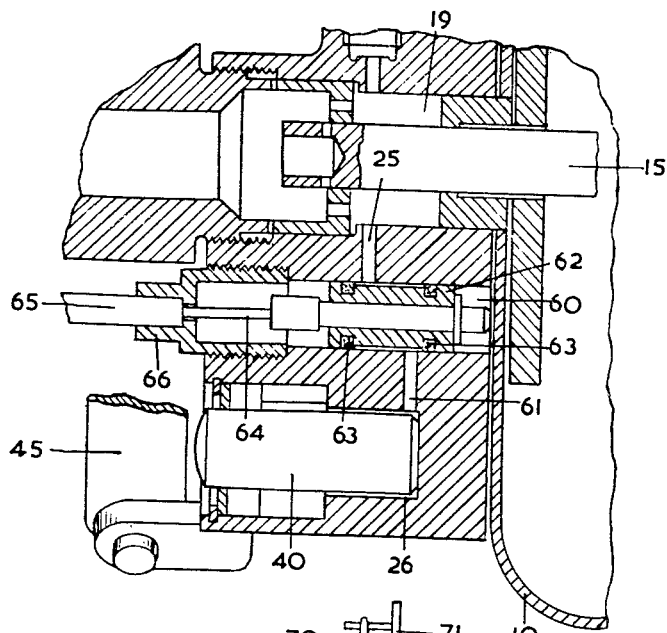
Figure 6:
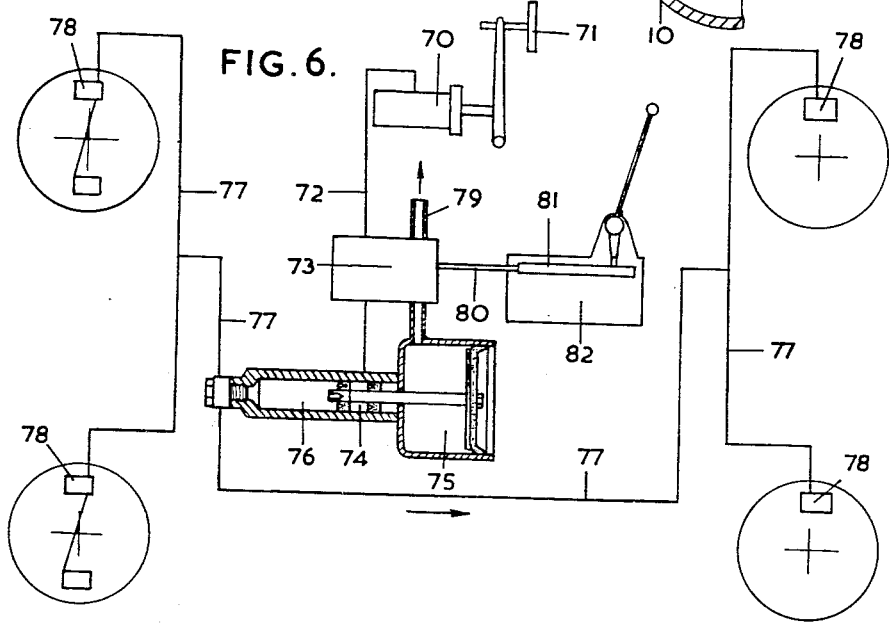

One practical form of my invention for application to vehicle brakes is illustrated by way of example in the accompanying drawings in which:

Figure 1 is a plan of the complete unit.
Figure 2 is an end elevation.
Figure 3 is a section on the line 3—3 of Figure 2.
Figure 4 is a section on the line 4—4 of Figure 2.
Figure 5 is a fragmentary section showing a shut-off valve actuated by the reverse gear selector.
Figure 6 is a diagrammatic view showing the application of the invention to a vehicle braking system.

In the drawings 10 is the vacuum booster cylinder which is a pressing or drawing of cup-shape closed at its open end by a light sheet metal cover 11 having an opening 12 for the admission of air.

A piston 13 provided with a flexible packing 14 works in the cylinder and is mounted on a piston rod 15 extending through an axial opening in the closed end of the cylinder. This end of the cylinder is secured against a flat end face of a housing 16 by means of bolts 17 anchored in the housing and passing through apertures in the end wall of the cylinder and in a washer plate 18 fitting against the inner face of the wall.

The outer end of the piston rod 15 extends through a cylindrical chamber 19 in the housing 16 in axial alignment with the vacuum cylinder. The inner end of the chamber is occupied by a bush 20 through which the piston-rod extends and an annular seal 21 for the piston-rod is located against the outer end of the bush by a spider 22. The chamber 19 in front of the seal communicates by way of a radial passage 23 with a union 24 adapted to be connected by a pipe-line to a pedal-operated hydraulic master cylinder. It also communicates by way of an opposed radial passage 25 with a slave cylinder 26 of which the function is described below. The outer end of the chamber 19 is occupied by a bush 27 having a deep axial recess in its outer end, and the bush is held against an internal shoulder in the chamber by the inner end of an auxiliary hydraulic cylinder 28 which is secured into the outer end of the chamber.

The outer end of the cylinder 28 is adapted to be connected by a pipe line to the brake cylinder or cylinders. Longitudinal passages 29 are formed in the inner end of the bush 27 and connect the chamber 19 with an annular space 31 between the inner end of the recess and the rear end of an annular seal 32 housed in the recess and located by a spider 33.

The length of the piston-rod 15 is such that in the fully retracted position of the piston of the vacuum cylinder in which it is normally held by a spring 34 the forward end of the piston-rod extends a short distance through the seal 32, and radial ports 35 in the piston-rod leading into an axial recess 36 in its outer end are in alignment with the annular space 31 behind the seal.

Liquid forced into the chamber 19 from the master cylinder can thus flow through the passages 29 in the bush 27 into the space 31 and from there through the ports 35 and recess 36 into the auxiliary cylinder 28 and so to the brake cylinder or cylinders.

Liquid also flows through the passage 25 into the slave cylinder 26. This cylinder contains a piston or plunger 40 working through a bush 41 and an annular seal 42 which are retained by a washer 43 and a spring ring 44 engaging in an annular groove in the open outer end of the cylinder.

The outer end of the plunger 40 is adapted to engage and actuate a lever 45 pivoted at one end in a forked lug 46 on the housing. The other end of the lever is pivotally connected to the outer end of a headed plunger 47 controlling the vacuum valve which is shown in detail in Figure 3. The vacuum valve is located in a chamber 48 formed by a recess in the housing which is closed by a domed cover 49 bolted to the housing and having a clearance opening for the passage of the plunger 47.

The chamber is divided by a diaphragm 50 of which the outer edge is clamped between the cover 49 and the housing. The inner edge of the diaphragm is clamped between shoulders on the two parts of a hollow cylindrical shell or cage 51, the two parts being screwed together. The diaphragm is loaded by a spring 50' which is arranged between the diaphragm and the cover 49 and urges the diaphragm towards the closed inner end of the chamber 48 so that normally, when pressures on opposite sides of the diaphragm are balanced, the rear end of the cage is urged against spaced ribs or projections on the inner wall of the chamber 48. This end of the cage has a forwardly extending annular lip 52 surrounding a hollow spigot 53 extending forwardly from the inner wall of the chamber. This hollow spigot is in communication with a passage 54 in the housing leading to a union 55 adapted to be connected to a source of vacuum which may be the induction manifold of the vehicle engine, a vacuum pump, or an evacuated reservoir.

The forward end of the spigot 53 forms an annular seating for a washered valve head 56 which is freely mounted in the cage 51 and is normally held in contact with the seating by a light spring 57 abutting between the valve head and the outer end wall of the cage, the diameter of the valve head being substantially equal to that of the lip 52 on the cage. The head of the plunger 47 lies within the cage against the inner face of the outer end wall and there are apertures 58 in this wall for the passage of air so that the interior of the cage is always at atmospheric pressure. The inner end of the chamber 48 on the inner side of the diaphragm is in communication by way of a passage 59 in the housing with the closed end of the vacuum cylinder.

In the normal position of the parts shown in Figure 3 the valve head 56 is in engagement with its seating and cuts off communication between the source of vacuum and the vacuum cylinder. Both sides of the diaphragm are under atmospheric pressure as air has access to the rear side of the diaphragm through the cage 51 and between the rear side of the cage and the rear wall of the chamber 48.

In applying the brakes the master cylinder forces liquid under pressure through the passage 23 into the chamber 19 from which some of the liquid flows by way of the passages 29, space 31, ports 35 and recess 36 into the auxiliary cylinder 28 and so through the pipe line to the brake cylinders to initiate the application of the brakes. At the same time liquid flows through the passage 25 into the cylinder 26.

The plunger 40 is forced outwardly and, through the lever 45, moves the headed plunger 47 to the left in Figure 3. The plunger takes the cage 51 with it until the annular lip 52 engages the valve head 56 and moves it away from its seating. The vacuum cylinder 10 is thus connected to the source of vacuum so that the pressure in the closed end of the cylinder is reduced and atmospheric pressure acting on the other side of the piston 13 moves the piston and piston-rod to the left. As soon as the ports 35 in the piston-rod pass into the seal 32 communication between the master cylinder and the auxiliary cylinder 28 is cut off, and on any further movement of the brake pedal all the liquid displaced by the piston of the master cylinder is applied to the plunger 40 in the slave cylinder 26 while the application of the brakes is continued by the movement of the piston-rod 15 of the vacuum cylinder into the auxiliary cylinder 28.

The engagement of the lip 52 on the cage 51 with the valve head 56 not only moves the head away from its seating to connect the booster cylinder to vacuum but cuts off communication between the two parts of the chamber 48 on opposite sides of the diaphragm 50 and connects the part of the chamber on the right hand side of the diaphragm to vacuum. Thus the right hand side of the diaphragm is exposed to the reduced pressure existing in the booster cylinder while the other side is exposed to atmospheric pressure so that the diaphragm tends to move to the right, taking with it the cage 51 and the valve head 56 to close the valve in opposition to the force exerted by the master cylinder on the plunger 40 tending to open the valve.

The greater the reduction in pressure in the booster cylinder the greater is the force exerted by the diaphragm so that the resistance to the pedal movement is always proportional to the effort exerted by the booster cylinder and the driver is given the "feel" of the brakes.

When the brake is released and the piston of the booster cylinder is fully retracted the ports 35 in the piston-rod cylinder is fully retracted the ports 35 in the piston-rod are again in alignment with the space 31 so that any deficiency in the liquid in the auxiliary cylinder 28 and in the pipe line leading from it to the brake cylinders will be made up by the transfer of liquid from the master cylinder when the brake is applied and before the vacuum valve is opened.

If it is desired to render the booster cylinder inoperative when the vehicle is travelling in reverse a shut off valve is provided between the chamber 19 and the slave cylinder 26 as shown for example in Figure 5. In this arrangement the passage 25 leading out of the chamber 19 enters a cylindrical bore 60 in the housing at a point displaced axially from a passage 61 leading from the opposite side of the bore to the cylinder 26. Slidably mounted in the bore is a piston-valve 62 of which the ends are a working fit in the bore. The central part of the piston-valve between two axially spaced annular seals 63 is of reduced diameter and is of a length greater than the axial spacing between the passages 25 and 61, and in the normal position of the piston-valve as shown in the drawing liquid can flow freely from the passage 25 into the passage 61 round the reduced central part of the valve.

Attached to the valve is a flexible cable 64 adapted to be connected to the selector for reverse gear in the vehicle gear-box. The cable works through a conduit 65 of which the end is received in an axial recess in a plug 66 screwed into the outer end of the bore.

When reverse gear is engaged the piston valve is moved outwardly until the reduced central part of the valve moves clear of the passage 61 and communication between the passages 25 and 61 is cut off. When the brake pedal is depressed liquid displaced from the master cylinder passes into the auxiliary cylinder 28 only to apply the brakes and the vacuum booster cylinder does not come into action.

The housing 16 with the attached booster cylinder is adapted to be mounted in any convenient position on a vehicle chassis and for this purpose the housing is provided with spaced lugs 67 to receive mounting bolts.

The layout of a vehicle braking system incorporating our invention is shown diagrammatically in Figure 6 of the drawings.

In this layout 70 is the master cylinder which is actuated by a pedal 71 and is connected by a pipe-line 72 to the housing 73 for the hydraulically controlled vacuum valve and to the chamber 74 between the booster cylinder 75 and the auxiliary cylinder 76. The outer end of the auxiliary cylinder is connected by pipe lines 77 to the wheel cylinders 78 of the vehicle wheel brakes.

The vacuum valve is connected by a pipe-line 79 to the inlet manifold of the vehicle engine and is in communication with the booster cylinder 75. The shut-off valve in the housing 73 is coupled through the cable 80 to the reverse gear selector 81 in the vehicle gear-box 82 to prevent the booster cylinder from coming into operation while reverse gear is engaged.

I claim:

1. A booster unit for a braking system of the kind set forth comprising a vacuum booster cylinder including a piston and a piston-rod and a housing associated with said booster cylinder and including an auxiliary hydraulic cylinder in axial alignment with the piston-rod of the booster cylinder and adapted to be connected to a pipe line leading to wheel brake cylinders, a constant-volume chamber in the housing through which the piston-rod passes, a stationary seal between the chamber and the auxiliary cylinder through which the piston-rod extends, a passage leading into the chamber and adapted to be connected to an hydraulic master cylinder, a slave cylinder connected to the chamber, a plunger in said slave cylinder, a vacuum valve operable in one direction by said plunger for connecting the booster cylinder to a source of vacuum, and a connection between the chamber and the auxiliary cylinder which is normally open but is adapted to be closed when the piston-rod is advanced through the seal on energization of the booster cylinder.

2. A booster unit as in claim 1 wherein the vacuum valve is associated with a diaphragm which is exposed on one side to atmosphere and is exposed on the other side to vacuum pressure in the booster cylinder, the diaphragm being adapted, on opening of the valve by the slave cylinder, to exert on the valve a force which tends to close it and is proportional to the force exerted by the booster cylinder.

3. A braking system as in claim 1 including means to prevent the booster cylinder from being energized when the vehicle is traveling in reverse, said last named means comprising a shut-off valve mounted in the connection of the chamber to the slave cylinder and controlling communication therebetween, a vehicle gear box, a reverse gear selector in said gear box, and a connecting element from the shut-off valve and connected to the reverse gear selector, whereby said shut-off valve is closed when reverse gear is engaged.

4. A vehicle braking system of the kind set forth comprising a vacuum booster cylinder including a piston and a piston-rod extending through one end of said cylinder, a housing fast with said end of the booster cylinder, an auxiliary hydraulic cylinder in said housing in axial alignment with the booster cylinder and adapted for connection to wheel brake cylinders, a constant-volume chamber intermediate said auxiliary cylinder and said booster cylinder adapted for connection to a source of liquid under pressure for creating hydraulic pressure within said chamber, a stationary seal at the end of said chamber adjacent the auxiliary cylinder, said piston rod extending through the chamber and seal into the auxiliary cylinder for displacing liquid therefrom when the piston is advanced by the booster piston on energization of the booster cylinder, a passage in the piston-rod normally connecting the constant-volume chamber and the auxiliary cylinder and adapted to be closed when the piston-rod is advanced on energization of the booster cylinder, and valve means responsive to the hydraulic pressure in the constant-volume chamber and to vacuum in the booster cylinder for controlling a connection between the booster cylinder and a source of vacuum.

5. A braking system as in claim 4 wherein said passage in the piston-rod comprises a recess extending axially from the end of the piston-rod which is at all times on the auxiliary cylinder side of the stationary seal and radial ports communicating with said recess and in alignment, when the piston-rod is in its normal retracted position, with a space on the chamber side of the seal which space is in communication with the chamber, said ports being closed by the seal to cut off communication between the chamber and the auxiliary cylinder when the piston-rod is advanced on energization of the booster cylinder.

6. A braking system as in claim 4 including means for preventing the booster cylinder from being energised when the vehicle is travelling in reverse.

7. A braking system as in claim 4 wherein the valve means comprises a second chamber, a diaphragm dividing the same into first and second compartments respectively in communication with atmosphere and with the booster cylinder, a hollow cage in the diaphragm opening at its ends into the respective compartments to normally maintain atmospheric pressure in the second compartment, a hollow spigot having a connection to a vacuum source and projecting into that open end of the cage disposed within the second compartment, said cage including an annular lip surrounding the spigot, a valve head free in the cage and normally seating on the spigot to close the same, and a member connected to the cage and responding to pressure prevailing in the constant volume chamber to shift the cage in a direction to cause the lip to lift the valve head from the spigot and to seat the valve head on the lip, thus to open the spigot and communicate the booster cylinder and second compartment with the vacuum source, simultaneously with closing of the lip-provided open end of the cage to cut off communication between the compartments.

References Cited in the file of this patent

UNITED STATES PATENTS

| | | |
|---|---|---|
| 2,059,069 | Weiss | Oct. 27, 1936 |
| 2,070,266 | Freeman | Feb. 9, 1937 |
| 2,260,492 | Steizer | Oct. 28, 1941 |
| 2,393,524 | Fant | Jan. 22, 1946 |
| 2,526,236 | Ingres | Oct. 17, 1950 |
| 2,596,348 | Tann | May 13, 1952 |
| 2,598,604 | Ringer | May 27, 1952 |